(12) United States Patent
Yao et al.

(10) Patent No.: US 10,878,121 B2
(45) Date of Patent: Dec. 29, 2020

(54) METHOD AND DEVICE FOR CONVERTING DATA CONTAINING USER IDENTITY

(71) Applicant: Tencent Technology (Shenzhen) Company Limited, Shenzhen (CN)

(72) Inventors: Qianqian Yao, Shenzhen (CN); Xingchun Ye, Shenzhen (CN); He Liu, Shenzhen (CN); Haichuan Zhang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 248 days.

(21) Appl. No.: 15/667,023

(22) Filed: Aug. 2, 2017

(65) Prior Publication Data
US 2017/0329993 A1 Nov. 16, 2017

Related U.S. Application Data

(63) Continuation of application No. PCT/CN2016/082414, filed on May 17, 2016.

(30) Foreign Application Priority Data

Dec. 23, 2015 (CN) .......................... 2015 1 0980369

(51) Int. Cl.
*G06F 21/62* (2013.01)
*G06F 16/25* (2019.01)
(Continued)

(52) U.S. Cl.
CPC .......... *G06F 21/6227* (2013.01); *G06F 16/00* (2019.01); *G06F 16/2282* (2019.01);
(Continued)

(58) Field of Classification Search
CPC ............. G06F 21/6245; G06F 21/6227; G06F 21/6254; G06F 16/2282; G06F 16/258;
(Continued)

(56) References Cited

U.S. PATENT DOCUMENTS 6,011,849 A * 1/2000 Orrin ...................... H04L 9/065
380/37
6,397,224 B1 * 5/2002 Zubeldia ............. G06F 21/6254
(Continued)

FOREIGN PATENT DOCUMENTS

CN       1670746 A     9/2005
CN     102063595 A     5/2011
(Continued)

OTHER PUBLICATIONS

International Search Report and Written Opinion received for PCT Application No. PCT/CN2016/082414 dated Oct. 8, 2016 (English and Chinese languages) (16 pp.).
(Continued)

*Primary Examiner* — Dant B Shaifer Harriman
*Assistant Examiner* — Mahabub S Ahmed
(74) *Attorney, Agent, or Firm* — Brinks Gilson & Lione

(57) ABSTRACT

A method for automatically converting electronic data is disclosed. The method comprises scanning a source data table containing data fields; determining a feature for each of the data fields of the source data table; comparing the feature for each of the data fields with a feature rule for identifying user-identity-containing data fields in the source data table; identifying a first data field of the source data table as containing user identity when the feature of the first data field matches the feature rule; identifying a second data field of the source data table as containing no user identity when the feature of the second data field fails to match the feature rule; converting the source data table by replacing data items of the first data field in the source data table identified as containing user identity with corresponding third-party user accounts, and keeping the second data field in the source data table identified as not containing user identity unal-
(Continued)

tered; and storing the converted data table in a storage medium.

12 Claims, 6 Drawing Sheets

(51) Int. Cl.
| | | |
|---|---|---|
| *G06F 16/22* | (2019.01) | |
| *H04L 29/06* | (2006.01) | |
| *H04W 12/02* | (2009.01) | |
| *H04L 29/12* | (2006.01) | |
| *G06F 16/00* | (2019.01) | |
| *G06N 5/04* | (2006.01) | |
| *H03M 7/30* | (2006.01) | |

(52) U.S. Cl.
CPC ........ *G06F 16/258* (2019.01); *G06F 21/6245* (2013.01); *G06F 21/6254* (2013.01); *G06N 5/047* (2013.01); *H03M 7/6047* (2013.01); *H04L 29/12594* (2013.01); *H04L 63/0421* (2013.01); *H04W 12/02* (2013.01); *H04L 2209/42* (2013.01)

(58) Field of Classification Search
CPC ...... G06F 16/00; G06N 5/022; H03M 7/6047; H04L 29/12594; H04L 63/0421; H04L 2209/42; H04W 12/02
USPC .......................................................... 726/26
See application file for complete search history.

(56) References Cited

U.S. PATENT DOCUMENTS

| | | | | |
|---|---|---|---|---|
| 8,626,749 | B1* | 1/2014 | Trepetin ................ | H04L 9/0894 707/722 |
| 9,442,980 | B1* | 9/2016 | Trepetin .............. | G06F 21/6254 |
| 10,013,576 | B2* | 7/2018 | Maeda ................ | G06F 21/6254 |
| 2002/0073138 | A1* | 6/2002 | Gilbert ................ | G06F 21/6254 709/201 |
| 2002/0169793 | A1* | 11/2002 | Sweeney ............ | G06F 21/6245 |
| 2003/0135765 | A1* | 7/2003 | Hind .................... | G06F 21/6227 726/7 |
| 2003/0208457 | A1* | 11/2003 | Iyengar ............... | G06F 21/6254 |
| 2006/0082592 | A1* | 4/2006 | Black-Ziegelbein ....................... G06T 11/206 345/605 |
| 2006/0179075 | A1* | 8/2006 | Fay ..................... | G06F 21/6245 |
| 2008/0028474 | A1* | 1/2008 | Horne .................. | H04L 9/3247 726/27 |
| 2008/0240425 | A1* | 10/2008 | Rosales .............. | G06F 21/6254 380/28 |
| 2009/0132419 | A1* | 5/2009 | Grammer ............ | G06F 21/6245 705/50 |
| 2009/0319588 | A1* | 12/2009 | Gandhi ................ | G06F 21/6254 |
| 2010/0114607 | A1* | 5/2010 | Kress .................... | G06Q 10/06 705/3 |
| 2010/0274788 | A1* | 10/2010 | Coker ................. | G06F 21/6227 707/737 |
| 2010/0293049 | A1* | 11/2010 | Maher .................. | G06F 16/335 705/14.46 |
| 2011/0113049 | A1* | 5/2011 | Davis .................. | G06F 21/6254 707/757 |
| 2011/0179011 | A1* | 7/2011 | Cardno ............... | G06F 21/6227 707/709 |
| 2012/0191983 | A1* | 7/2012 | Simske ............... | G06F 21/6209 713/189 |
| 2012/0204231 | A1* | 8/2012 | Holtmanns ..... | H04W 12/04031 726/3 |
| 2012/0284529 | A1* | 11/2012 | Crowe ................ | G06F 21/6227 713/189 |
| 2012/0297017 | A1* | 11/2012 | Livshits ................ | H04W 12/02 709/217 |
| 2013/0054650 | A1* | 2/2013 | O'Byrne ............. | G06F 21/6227 707/793 |
| 2013/0227658 | A1* | 8/2013 | Leicher ............... | H04L 63/0876 726/5 |
| 2013/0332990 | A1* | 12/2013 | Burke ................. | G06F 21/6245 726/1 |
| 2014/0068736 | A1* | 3/2014 | Agerstam ............ | H04L 63/08 726/7 |
| 2014/0096205 | A1* | 4/2014 | Zhuang ................. | H04L 63/10 726/4 |
| 2014/0137262 | A1* | 5/2014 | Stofberg ............. | G06F 11/1453 726/26 |
| 2014/0230027 | A1* | 8/2014 | Cha ...................... | H04L 63/0815 726/5 |
| 2014/0245389 | A1* | 8/2014 | Oberheide .......... | H04L 63/0815 726/3 |
| 2014/0359782 | A1* | 12/2014 | Golic .................. | G06F 21/6254 726/26 |
| 2015/0007263 | A1* | 1/2015 | Stewart ............... | H04L 63/0815 726/3 |
| 2015/0058930 | A1* | 2/2015 | Mitchell ................. | H04L 63/08 726/3 |
| 2015/0142986 | A1* | 5/2015 | Reznik .................. | H04L 63/08 709/228 |
| 2015/0287416 | A1* | 10/2015 | Brands ................ | H04L 9/0866 704/273 |
| 2015/0295917 | A1* | 10/2015 | Platt .................... | H04L 63/0815 709/228 |
| 2015/0319156 | A1* | 11/2015 | Guccione ............. | H04L 63/105 726/7 |
| 2015/0324607 | A1* | 11/2015 | Mushkatblat ....... | G06F 21/6254 726/26 |
| 2015/0365399 | A1* | 12/2015 | Biswas ............... | H04L 63/0815 726/8 |
| 2016/0004827 | A1* | 1/2016 | Silva ...................... | G16H 40/67 706/46 |
| 2016/0085996 | A1* | 3/2016 | Eigner ................ | G06F 21/6227 713/193 |
| 2016/0134595 | A1* | 5/2016 | Lavinio ................ | G06F 21/606 713/168 |
| 2016/0246996 | A1* | 8/2016 | Khoo ..................... | G06F 3/048 |
| 2016/0323248 | A1* | 11/2016 | Zeira ...................... | H04W 4/21 |
| 2016/0342812 | A1* | 11/2016 | Lynch ............... | H04W 12/0013 |
| 2016/0364707 | A1* | 12/2016 | Varma ................... | G06F 21/50 |
| 2017/0098093 | A1* | 4/2017 | Koo ................... | G06F 21/6209 |
| 2018/0013782 | A1* | 1/2018 | Choyi ................. | H04L 63/083 |
| 2018/0218515 | A1* | 8/2018 | Terekhov ............... | G06K 9/32 |
| 2018/0232522 | A1* | 8/2018 | Shear ................... | G06F 21/445 |
| 2018/0300504 | A1* | 10/2018 | Hailpern ............... | G06F 21/34 |
| 2020/0064956 | A1* | 2/2020 | Khoo .................. | G06F 21/6245 |

FOREIGN PATENT DOCUMENTS

| | | | |
|---|---|---|---|
| CN | 103067398 A | 4/2013 | |
| CN | 104573094 A | 4/2015 | |
| JP | 2011-022826 A | 2/2011 | |
| WO | WO-03021473 A1 * | 3/2003 | ......... G06F 21/6254 |

OTHER PUBLICATIONS

Office Action dated Nov. 5, 2019 for Chinese Application No. 201510980369.8 with concise English Translation, 7 pages.

* cited by examiner

| Sequence number field | Name field | Gender field | User identity field | Age field | Address field |
|---|---|---|---|---|---|
| 1 | Wang Xiaoming | Male | 12345 | 20 | Shenzhen |
| 2 | Li Xiaobai | Male | 234567 | 22 | Guangzhou |
| 3 | Zhao Xiaohong | Female | 4456785 | 24 | Beijing |
| …… | | | | | |

METHOD AND DEVICE FOR CONVERTING DATA CONTAINING USER IDENTITY

CROSS REFERENCE TO RELATED APPLICATIONS

This application is a continuation of International Patent Application PCT/CN2016/082414, filed May 17, 2016, which claims priority to Chinese Patent Application No. 201510980369.8, entitled "METHOD AND DEVICE FOR PROCESSING USER IDENTITY", filed with the Chinese Patent Office on Dec. 23, 2015, both of which are incorporated herein by reference in their entirety.

FIELD OF THE TECHNOLOGY

The present disclosure relates to the field of automatic data identification and conversion, and in particular to a method for processing a user identity, a terminal, and a non-volatile computer readable storage medium.

BACKGROUND OF THE DISCLOSURE

With developments of the computer technology and the Internet technology, more users begin to enjoy convenience brought by the Internet technology. generating massive amount of data at the same time. The massive data includes a lot of private user identity information that needs to be protected. However, the user identity information may be stored in a lot of data tables. These tables have complex structures, and their size may reach hundreds of TBs (terabytes). Therefore, it is inefficient to manually process the entire data for identifying user identity information. Conventional automated methods for identifying the user identity are mainly based on fuzzy searching, or by limiting a data value range for the user identity, or by matching based on traversing all registration data. However, the error rate is high and efficiency is low when using these approaches.

SUMMARY

Based on the above, it is desired to provide a method for processing and identifying user identity fields in a data set, so as to improve accuracy and efficiency of identification, and improve security of the user identity.

In addition, it is necessary to provide a terminal and a non-volatile computer readable storage medium, so as to improve accuracy and efficiency of identification, and improve security of the user identity.

A method for processing a user identity, including the following steps:

scanning a source data table to obtain a feature of data corresponding to each field of the source data table;

matching the feature of the data corresponding to each field with a feature rule of the user identity, if the feature of the data corresponding to the field succeeds in matching the feature rule of the user identity, the data corresponding to the field being the user identity, and if the feature of the data corresponding to the field fails to match the feature rule of the user identity, the data corresponding to the field being not the user identity; and converting the data that corresponds to the field in the source data table and that is the user identity into a third-party user account, and keeping the data that corresponds to the field in the source data table and that is not the user identity unchanged.

A terminal, including a memory and a processor, the memory storing a computer readable instruction, and the instruction, when executed by the processor, causing the processor to perform the following steps:

scanning a source data table to obtain a feature of data corresponding to each field of the source data table;

matching the feature of the data corresponding to each field with a feature rule of the user identity, if the feature of the data corresponding to the field succeeds in matching the feature rule of the user identity, the data corresponding to the field being the user identity, and if the feature of the data corresponding to the field fails to match the feature rule of the user identity, the data corresponding to the field being not the user identity; and converting the data that corresponds to the field in the source data table and that is the user identity into a third-party user account, and keeping the data that corresponds to the field in the source data table and that is not the user identity unchanged.

One or more non-volatile computer readable storage media including computer executable instructions, the computer executable instructions, when executed by one or more processors, causing the processor to perform the following steps:

scanning a source data table to obtain a feature of data corresponding to each field of the source data table;

matching the feature of the data corresponding to each field with a feature rule of the user identity, if the feature of the data corresponding to the field succeeds in matching the feature rule of the user identity, the data corresponding to the field being the user identity, and if the feature of the data corresponding to the field fails to match the feature rule of the user identity, the data corresponding to the field being not the user identity; and converting the data that corresponds to the field in the source data table and that is the user identity into a third-party user account, and keeping the data that corresponds to the field in the source data table and that is not the user identity unchanged.

Details of one or more embodiments of the present invention are provided in the following accompanying drawings and descriptions. Other features, objectives, and advantages of the present disclosure become more obvious with reference to the specification, the accompanying drawings, and the claims.

BRIEF DESCRIPTION OF THE DRAWINGS

To describe the technical solutions in the embodiments of the present invention or in the existing technology more clearly, the following briefly describes the accompanying drawings required for describing the embodiments or the existing technology. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer, the present disclosure is further described in detail with reference to the accompanying drawings and the embodiments. It should be understood that the specific embodiments described herein are merely intended to explain the present disclosure, but are not intended to limit the present disclosure.

It should be understood that, terms used in the present disclosure such as "first" and "second" may be used herein to describe various elements, but these elements are not limited by the terms. These terms are only intended to distinguish a first element from another element. For example, a first client may be referred to as a second client without departing from the scope of the present disclosure. Similarly, the second client may be referred to as the first client.

Figure 1A:
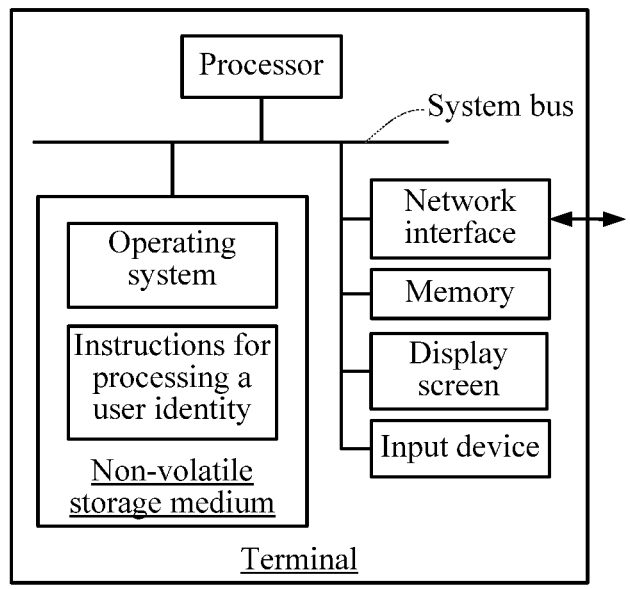
FIG. 1A is a schematic diagram of a terminal device according to an embodiment.

FIG. 1A is a schematic diagram of a terminal according to an embodiment. A terminal may be alternatively referred to as a terminal device. As shown by the annotated elements in FIG. 1A, the terminal includes a processor, a storage medium such as a non-volatile storage medium, a memory, a network interface, a display screen, and an input device that are connected by using a system bus. The storage medium of the terminal stores an operating system, and further includes instructions executed by the processor for processing a user identity. The processor is further configured to provide calculating and control capabilities, and support operation of the entire terminal. The memory in the terminal provides an environment for the instructions for processing a user identity in the storage medium to operate. The network interface is configured to perform network communications with the server, for example, to send a data request to the server, or receive data returned by the server. The display screen of the terminal may be a liquid crystal display screen or an electronic ink display screen. The input device may be a touch panel disposed over the display screen, or may be a key, a trackball, or a touchpad disposed on a housing of the terminal, or may be an external keyboard, touchpad, or mouse. The terminal may be a mobile phone, a tablet computer, or a personal digital assistant. A person skilled in the art may understand that the structure shown in FIG. 1A is merely an exemplary block diagram of a part of the structure that is related to the solutions of this application, and does not constitute a definition to the terminal to which the solutions of this application are applied. The specific terminal may include more or fewer components than the components shown in FIG. 1A, or combine some components into one component, or have different component arrangements.

Figure 1B:
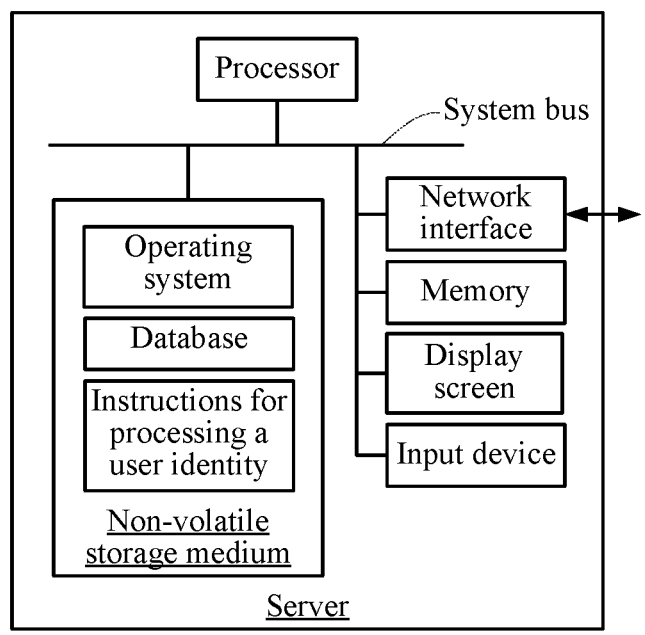
FIG. 1B is a schematic diagram of a server device according to an embodiment.

FIG. 1B is a schematic diagram of a server according to an embodiment. As shown in FIG. 1B, the server includes a processor, a non-volatile storage medium, a memory, a network interface, a display screen, and an input device that are connected by using a system bus. The non-volatile storage medium of the server stores an operating system, a database, and instructions executed by the processor for processing a user identity. The database stores various data, a user identity, data of a third-party user account, and corresponding relationships thereof. The processor of the server is further configured to provide calculating and control capabilities, and support operation of the entire server. The memory of the server provides an environment for the instructions for processing a user identity in the non-volatile storage medium to operate. The display screen of the server may be a liquid crystal display screen or an electronic ink display screen. The input device may be a touch panel disposed over the display screen, or may be a key, a trackball, or a touchpad disposed on a housing of the terminal, or may be an external keyboard, touchpad, or mouse. The network interface of the server is configured to communicate with an external terminal through a network connection, for example, to receive a user identity request sent by the terminal, and return the third-party user account to the terminal. The server may be implemented by using an independent server, or a server cluster composed of a plurality of servers. A person skilled in the art may understand that the structure shown in FIG. 1B is merely an exemplary block diagram of a part of the structure that is related to the solutions of this application, and does not constitute a definition to the server to which the solutions of this application are applied. The specific server may include more or fewer components than the components shown in FIG. 1B, or combine some components into one component, or have different component arrangements.

Figures 2, 3:
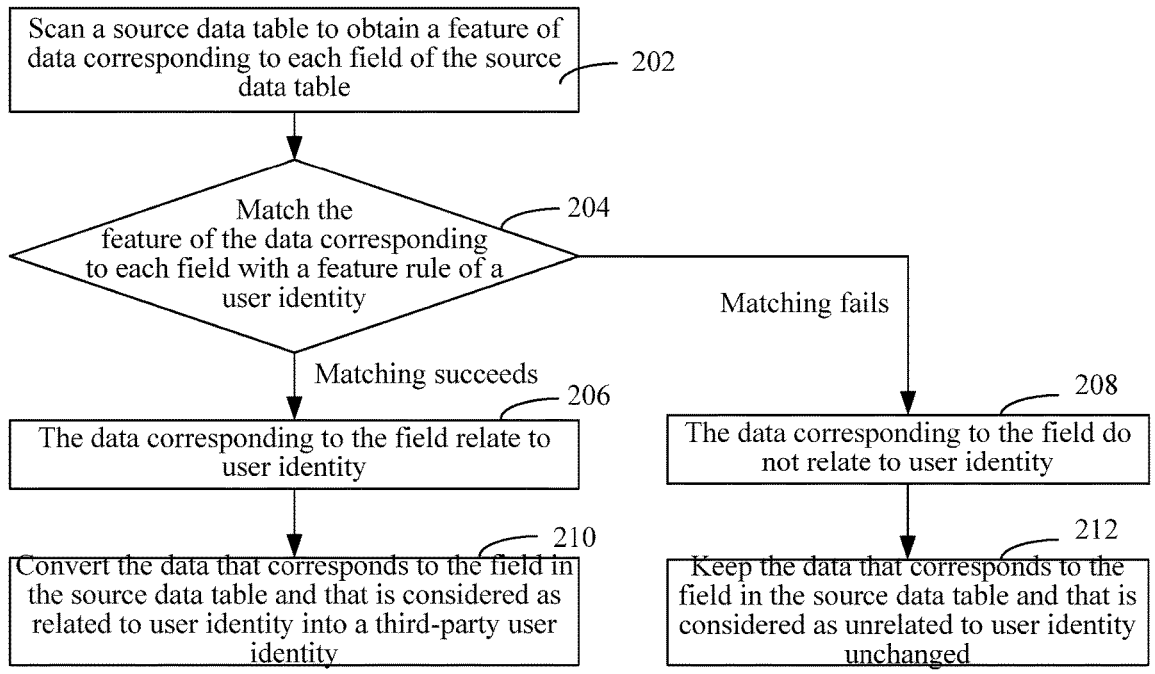
FIG. 2 is a logic flow for identifying and processing a user identity in a source data according to an embodiment.
FIG. 3 shows an exemplary data table in a source data containing user identity information.

FIG. 2 is a flowchart or logic flow of a method for processing a user identity according to an exemplary embodiment. As shown in FIG. 2, the method for processing a user identity may be implemented on the server or the terminal in FIG. 1, and include the following steps:

Step 202: Scan a source data table to obtain a feature of data corresponding to each field of the source data table.

Specifically, the source data table refers to data obtained from a network, and usually the data is stored in a tabular form. There is one or more fields in the source data table, and each field represents a type of data, for example, a sequence number field, a name field, a user identity field, a gender field, an age field, or an address field.

FIG. 3 shows an example of a source data table according to an embodiment. As shown in FIG. 3, a first line of the source data table includes a sequence number field, a name field, a gender field, a user identity field, an age field, and an address field. Each field corresponds to a column. Data corresponding to the sequence number field may be a natural number that starts from 1 and is in an auto increment of 1. Data corresponding to the name field may be various names, such as Wang Xiaoming, Li Xiaobai, and Zhao Xiaohong. Data corresponding to the gender field may be "male", "female", or "unknown". Data corresponding to the user identity field may be data that complies with rules of the user identity, such as instant messaging accounts from 12345 to 9999999999. Data corresponding to the age field may be from 0 to 150. Data corresponding to the address field may be various addresses.

The source data table in this embodiment may be data generated from user activities at various web sites.

For data corresponding to each field in the source data table, a feature of the data is calculated. The feature may include an average value and a standard deviation. As combinational properties of the data in a particular field, the average value and the standard deviation are relatively stable, and are a more reliable representation of the data. In addition, the feature may further include a maximal value and a minimum value.

Step 204: Match the feature of the data corresponding to each field with a feature rule of a user identity.

Specifically, the feature rule of the user identity may be obtained in advance by performing statistical analysis of massive data including user identity data. The feature rule of the user identity may be that the average value and the standard deviation are within a range. Feature rules of different types of user identities are different, and a feature rule of a corresponding type of user identity needs to be obtained through a statistic analysis of the massive data.

The user identity is an identity for uniquely representing a user. The user identity may be an instant messaging account, a mobile communication identity, an email address, an ID card number, or a payment account number.

The feature of the data corresponding to a field is matched with the feature rule of the user identity. For example, the feature rule of the user identity is that the average value is between 100000 and 110000, and the standard deviation is between 1 and 2. If features of data corresponding to a calculated field, e.g., an average value and a standard deviation, are respectively between 100000 and 110000, and between 1 and 2, the features of the data corresponding to the field are then considered as succeeding in matching the feature rule of the user identity. If a feature of the data corresponding to the calculated field, e.g., any one of the average value and the standard deviation, does not comply with the feature rule of the user identity, the feature of the data corresponding to the field may be considered as failing to match the feature rule of the user identity.

Step 206: If the feature of the data corresponding to the field succeeds in matching the feature rule of the user identity, the data corresponding to the field may be related to and is identified as containing user identity, and then step 210 is performed.

Step 208: If the feature of the data corresponding to the field fails to match the feature rule of the user identity, the data corresponding to the field may be unrelated to and is identified as not containing user identity, and then step 212 is performed.

Step 210: Convert the data that corresponds to the field in the source data table that is related to user identity into a third-party user identity.

Specifically, the third-party user identity may be an open user identity, e.g., an openID. The openID allows a user to log in the third-party platform by using the openID, but does not disclose the user identity to a third party, thereby providing a secure implementation manner for using user identity. A mapping relationship between the user identity and a third-party user account is pre-established, and then the corresponding third-party user account is searched according to the user identity from the mapping relationship between the user identity and the third-party user account, so as to replace the user identity with the third-party user account when logging into the third party account.

Step 212: Keep the data that corresponds to the field in the source data table and that is not related to user identity unchanged (or unaltered).

The source data table is kept unchanged if none of the data corresponding to all fields in the source data table is considered related to or identified as containing user identity.

According to the foregoing method for processing a user identity, by obtaining a feature of data corresponding to each field in a source data table, the feature of the data corresponding to each field is matched with a feature rule of the user identity. If the matching succeeds, the data corresponding to the field is converted into a third-party user account. If matching fails, the data corresponding to the field is kept unchanged. Matching by using the feature rule of the user identity improves accuracy and efficiency of identifying data fields related to user identity. Moreover, the data identified as containing user identity is converted into a third-party user account, and a third-party platform is prevented from obtaining the user identity, thereby improving security of the user identity.

Figure 4:
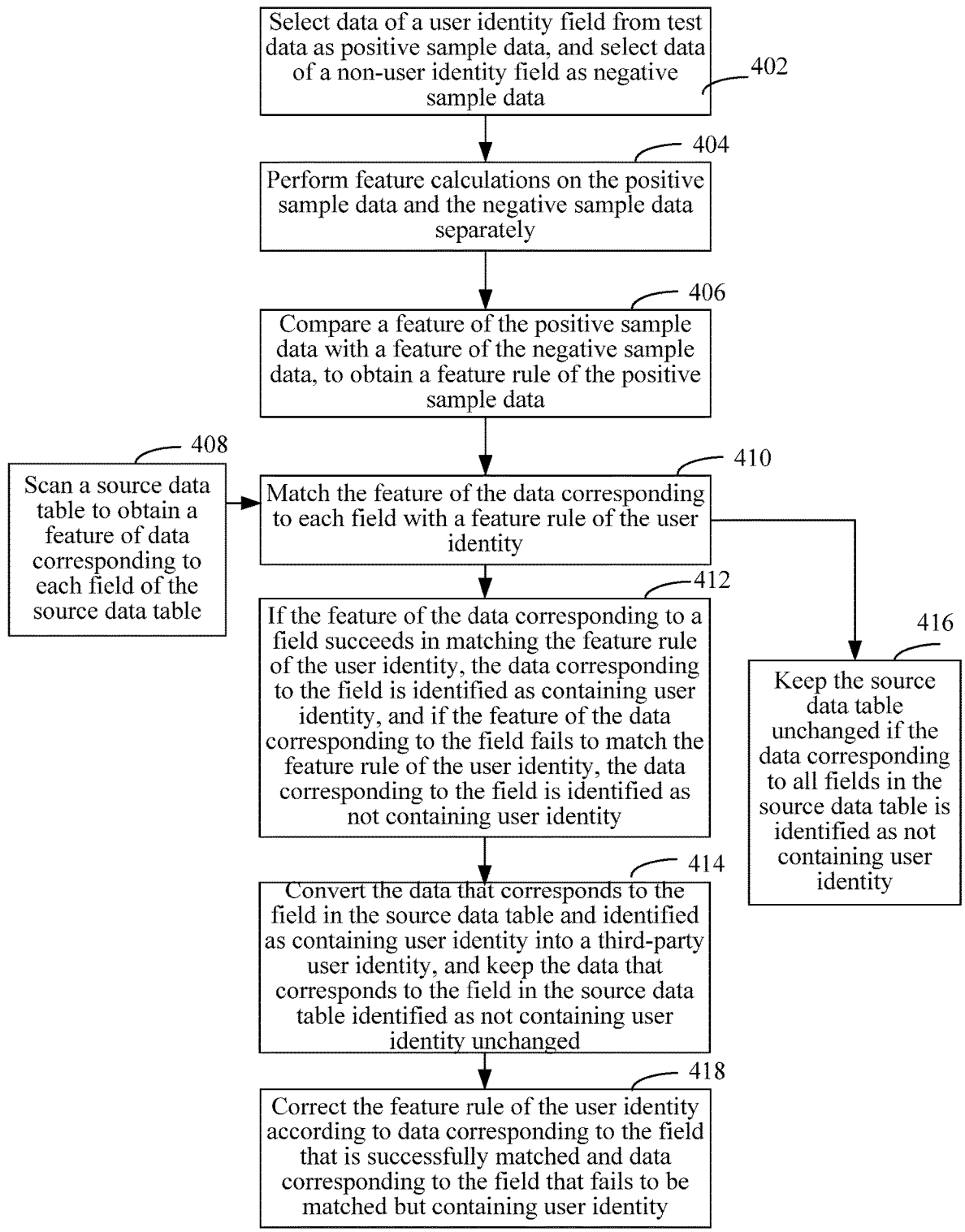
FIG. 4 is a logic flow for identifying and processing a user identity according to another embodiment.

FIG. 4 is a logic flow of a method for processing a user identity according to another embodiment. As shown in FIG. 4, the method for processing a user identity includes the following steps:

Step 402: Select data of a user identity field from test data as positive sample data for user identity, and select data of a non-user identity field as negative sample data for user identity.

Specifically, the test data may be taken form the massive network usage data. The user identity is an identity for uniquely representing a user. The user identity may be an instant messaging account, a mobile communication identity, an email address, an ID card number, or a payment account number.

For example, if the user identity is an instant messaging account, the test data may include data of the instant messaging account, advertisement exposure data, commodity order path data, web browsing data, user search data, and the like. Data corresponding to an instant messaging account field is extracted from the test data to serve as the positive sample data. Data corresponding to a non-instant messaging account field is randomly selected to serve as the negative sample data, and the negative sample data serves as a reference group.

Step 404: Perform feature calculations on the positive sample data and the negative sample data, separately.

Specifically, average values and standard deviations of the positive sample data sets and the negative sample data sets are respectively obtained. Maximal values and minimum values may also be obtained. Features of the calculated positive sample data and negative sample data may be collected in a table with, e.g., fields as rows and features as columns. A statistics distribution state of features of the user identity may be obtained after separately performing feature calculations on the positive sample data and the negative sample data to obtain the features and a distribution characteristics of the features may be obtained from the statistics of the features.

Step 406: Compare a feature of the positive sample data with a feature of the negative sample data, to obtain a feature rule (alternatively referred to as a feature characteristics) of the positive sample data.

Specifically, the feature of the positive sample data and the feature of the negative sample data may be collected. By comparing the features through, e.g., a bar chart, it may be determined that the features of the positive sample data and the negative sample data are significantly different. Therefore, a reliable range of feature for the user identity is extracted, and then the feature rule of the user identity is established.

Step 408: Scan a source data table to obtain a feature of data corresponding to each field of the source data table.

Specifically, the source data table refers to data obtained from a network, and usually the data is stored in a tabular form. There is one or more fields in the source data table, and each field represents a type of data, for example, a sequence number field, a name field, a user identity field, a gender field, an age field, or an address field.

Step 410: Match the feature of the data corresponding to each field with a feature rule of the user identity.

Specifically, the feature rule of the user identity may be obtained in advance by performing statistical analysis of massive data including user identity data. The feature rule of the user identity may be that the average value and the standard deviation are within a range. Feature rules of different types of user identities are different, and a feature rule of a corresponding type of user identity needs to be obtained through a statistic analysis of the massive data.

The user identity is an identity for uniquely representing a user. The user identity may be an instant messaging account, a mobile communication identity, an email address, an ID card number, or a payment account number.

The feature of the data corresponding to a field is matched with the feature rule of the user identity. For example, the feature rule of the user identity is that the average value is between 100000 and 110000, and the standard deviation is between 1 and 2. If features of data corresponding to a calculated field, e.g., an average value and a standard deviation, are respectively between 100000 and 110000, and between 1 and 2, the features of the data corresponding to the field are then considered as succeeding in matching the feature rule of the user identity. If a feature of the data corresponding to the calculated field, e.g., any one of the average value and the standard deviation, does not comply with the feature rule of the user identity, the feature of the data corresponding to the field may be considered ad failing to match the feature rule of the user identity.

Step 412: If the feature of the data corresponding to the field succeeds in matching the feature rule of the user identity, the data corresponding to the field may be related to user identity, and if the feature of the data corresponding to the field fails to match the feature rule of the user identity, the data corresponding to the field may be unrelated to user identity.

Step 414: Convert the data that corresponds to the field in the source data table and that is related to user identity into a third-party user identity, keep the data that corresponds to the field in the source data table and that is unrelated to user identity unchanged, and then step 418 is performed.

Specifically, the third-party user identity may be an open user identity, e.g., an openID. The openID allows a user to log in a third-party platform by using the user identity, but does not disclose the user identity to the third party, thereby providing a secure implementation manner for using user identity. A mapping relationship between the user identity and a third-party user account is pre-established, and then the corresponding third-party user account is searched according to the user identity from the mapping relationship between the user identity and the third-party user account, so as to replace the user identity with the third-party user account when logging into the third party account.

Step 416: Keep the source data table unchanged if the data corresponding to all fields in the source data table is unrelated to user identity.

Step 418: Adjust or correct the feature rule of the user identity according to data corresponding to a field in the source data table that is successfully matched and data corresponding to a field in the source data table that fails to be matched and that contains the user identity.

Specifically, during a process of matching the data corresponding to the field with the feature rule of the user identity, mis-identification of the field may exist. By obtaining and based on the data corresponding to the field that is successfully matched and the data corresponding to the field that fails to be matched but containing user identity, the feature rule of the user identity may be corrected. For example, a naming rule and/or a type of the user identity may be obtained by analyzing the data corresponding to the field that fails to be matched but containing user identity. The naming rule and/or the type of the user identity is added into the feature rule of the user identity. As such, the field would not be misidentified as not containing user identity in a next matching. If the data corresponding to the field that is considered matched is determined to be erroneously identified, the feature rule of the user identity may be corrected according to a feature of the data corresponding to the field.

According to the foregoing method for processing a user identity, data fields containing user identity are selected as positive sample data, and data that do not contain user identity are selected as negative sample data. A feature of the positive sample data and a feature of the negative sample data are calculated, and a feature rule of the positive sample data is obtained through a comparison. As a result, a relatively accurate feature rule of the user identity may be obtained. By obtaining a feature of data corresponding to each field in a source data table, the feature of the data corresponding to each field is matched with a feature rule of the user identity. If matching succeeds, the data corresponding to the field is converted into a third-party user account. If matching fails, the data corresponding to the field is kept unchanged. Matching by using the feature rule of the user identity improves accuracy and efficiency of identifying the user identity. Moreover, identified user identity is converted into a third-party user account, and a third-party platform is prevented from obtaining the user identity, thereby improving security of the user identity. The feature rule of the user identity is adjusted and corrected according to data corresponding to the field that is successfully matched and data corresponding to the field that fails to be matched but actually containing user identity. Therefore, the feature rule of user identity may be continuously improved, and accuracy of identification is improved.

In an embodiment, the foregoing method for processing a user identity further includes: after the step of converting the data that corresponds to the field in the source data table identified as containing user identity into a third-party user account, and keeping the data that corresponds to the field in the source data table and that is not identified as user identity unchanged, obtaining the data corresponding to a data field that is in the source data table and that fails to be matched but containing user identity; and correcting the feature rule of the user identity according to the data corresponding to the field that fails to be matched but containing user identity.

Specifically, a naming rule and/or a type of the user identity may be obtained by analyzing the data corresponding to the field that fails to be matched but containing user identity. The naming rule and/or the type of the user identity is added into the feature rule of the user identity, and therefore, the field would not be misidentified as not containing user identity in a next matching.

An implementation process of the method for processing a user identity is described below with reference to specific application scenarios. The method for processing a user identity is used for identifying an instant messaging account of data of a third-party platform and stores the same into a database. The specific process includes (1) to (5):

(1) Selecting data corresponding to an instant messaging account field from test data as positive sample data, and select data corresponding to a non-instant messaging account field as negative sample data.

Specifically, registration data of an instant messaging application and user behavior and activity data of a third-party platform are used as the test data. For example, data of an instant messaging application QQ includes registered user data. The user behavior data of the third-party platform, for example, the JD.COM, has five data species, including advertisement exposure data, commodity order path data, web browsing data, user search data, and the like. The instant messaging account field is selected from the registration data of the instant messaging application and the user behavior data of the third-party platform as the positive sample data, and the data corresponding to the non-instant messaging account field is selected as the negative sample data.

A statistics calculation may be performed on a feature by means of block sampling and statistics or by means of full-table statistics. The block sampling and statistics refers to extract a part of the data for statistics. The full-table statistics refer to performing analysis and statistics on all data tables.

(2) Perform feature calculations on the positive sample data and the negative sample data, separately, where the feature includes an average value and a standard deviation.

Specifically, average values and standard deviations of the positive sample data and the negative sample data are respectively obtained. In addition, maximal values and minimum values may also be obtained. Features of the calculated positive sample data and negative sample data are collected in a table with fields as rows and features as columns.

(3) Compare a feature of the instant messaging account with a feature of the non-instant messaging account, to obtain a feature rule of the instant messaging account.

Specifically, the feature of the instant messaging account and the feature of the non-instant messaging account may be collected. By comparing via a bar chart, it may be determined that the features of the instant messaging account and the non-instant messaging account are significantly different. Therefore, a reliable range of data of the instant messaging account is extracted, and then the feature rule of the instant messaging account is established.

(4) Scan a source data table of a third-party platform to obtain a feature for data corresponding to each field of the source data table; match the feature of the data corresponding to each field with the feature rule of the instant messaging account. If the feature for the data corresponding to the field succeeds in matching the feature rule of the instant messaging account, the data corresponding to the field may be identified as the instant messaging account. If the feature for the data corresponding to the field fails to match the feature rule of the instant messaging account field, the data corresponding to the field may be identified as not being instant messaging account field. The data that corresponds to the field in the source data table identified as instant messaging account field is converted into a third-party user identity, and the data that corresponds to the field in the source data table not identified as instant messaging account field is kept unchanged.

Specifically, the instant messaging account in the source data table of the third-party platform is identified. The instant messaging account is converted into a third-party user account, that is, an openID, according to a mapping relationship between the instant messaging account and the third-party user account. Subsequently, the entire data table is stored in a database. The third-party platform cannot directly obtain the user identity, but only obtains the openID. Therefore, a secure of user identity is improved.

During this process, once a feature rule and a list of data tables that need to be modified is configured, then the feature rule and the list of data tables that need to be modified are automatically identified and converted by a big data platform according to the implementations above, and are stored in a database, saving labor.

(5) Correct the feature rule of the instant messaging account according to data corresponding to the field that is successfully matched and data corresponding to the field that fails to be matched but containing instant messaging account.

Specifically, for the converted data, a status whether the data is identified may be recorded, including that an existing instant messaging account field is identified and a field containing the instant messaging account is not identified. The feature rule of the instant messaging account is corrected according to that the existing instant messaging account field is identified and the field containing the instant messaging account is not identified, thereby continuously improving to improve accuracy of identification. A naming rule and/or a type of the instant messaging account is obtained by processing the data corresponding to the field that fails to be matched but containing instant messaging account. The naming rule and/or the type of the instant messaging account is added into the feature rule of the instant messaging account field, and therefore, the field would not be left out in a next matching.

After feature rules obtained according to the positive sample data and the negative sample data are corrected several times, accuracy for identifying a QQ account reaches 94.5%. The instant messaging account may be a QQ account, or WeChat, or another instant messaging account.

It should be noted that the foregoing specific application scenarios describe a process of identifying and processing the instant messaging account, but are not limited thereto. The foregoing method for processing a user identity may also be applied to identifying and processing an ID card number, a mobile communication identity, a payment account number, or an email address.

Figure 5:
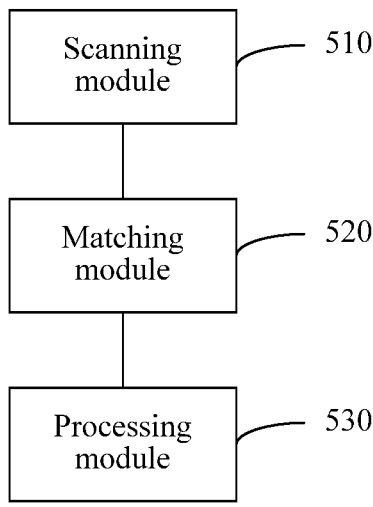
FIG. 5 is a block diagram of a device for identifying and processing a user identity according to an embodiment.

FIG. 5 is a structural block diagram of a device for processing a user identity according to an embodiment. As shown in FIG. 5, a device for processing a user identity includes a scanning module 510, a matching module 520, and a processing module 530.

The scanning module 510 is configured to scan a source data table to obtain a feature of data corresponding to each field of the source data table.

Specifically, the source data table refers to data obtained from a network, and usually the data is stored in a tabular form. There is one or more fields in the source data table, and each field represents a type of data, for example, a sequence number field, a name field, a user identity field, a gender field, an age field, or an address field.

The matching module 520 is configured to match the feature of the data corresponding to each field with a feature rule of the user identity. If the feature of the data corresponding to the field succeeds in matching the feature rule of the user identity, the data corresponding to the field is identified as containing user identity, and if the feature of the data corresponding to the field fails to match the feature rule of the user identity, the data corresponding to the field is identified as not containing user identity.

Specifically, the feature rule of the user identity may be obtained in advance by performing statistical analysis of massive data including user identity data. The feature rule of the user identity may be that an average value and a standard deviation are within a range. Feature rules of different types of user identities are different, and a feature rule of a corresponding type of user identity needs to be obtained through a statistic analysis of the massive data.

The user identity is an identity for uniquely representing a user identity. The user identity may be an instant messaging account, a mobile communication identity, an email address, an ID card number, or a payment account number.

The source data table in this embodiment may be data generated by user activities and behaviors on various web sites.

For data corresponding to each field in the source data table, a feature of the data is calculated. The feature may include an average value and a standard deviation. As combinational properties of the data in a particular field, the average value and the standard deviation are relatively stable, and are a more reliable representation of the data. In addition, the feature may further include a maximal value and a minimum value.

The processing module 530 is configured to convert the data that corresponds to the field in the source data table identified as containing user identity into a third-party user account, and keep the data that corresponds to the field in the source data table not identified as containing user identity unchanged.

Specifically, a third-party user identity may be an open user identity, e.g., an openID. The openID allows a user to log in a third-party platform by using the user identity, but does not disclose the user identity to the third party, thereby providing a secure implementation manner for using user identity. A mapping relationship between the user identity and a third-party user account is pre-established, and then the corresponding third-party user account is searched according to the user identity from the mapping relationship between the user identity and the third-party user account, so as to replace the user identity with the third-party user account when logging into the third party account.

The source data table is kept unchanged if none of the data corresponding to all fields in the source data table is identified as containing user identity.

According to the foregoing device for processing a user identity, by obtaining a feature of data corresponding to each field in a source data table, the feature of the data corresponding to each field is matched with a feature rule of the user identity. If the matching succeeds, the data corresponding to the field is converted into a third-party user account. If matching fails, the data corresponding to the field is kept unchanged. Matching by using the feature rule of the user identity improves accuracy and efficiency of identifying data fields related to user identity. Moreover, the data identified as containing user identity is converted into a third-party user account, and a third-party platform is prevented from obtaining the user identity, thereby improving security of the user identity.

Figure 6:
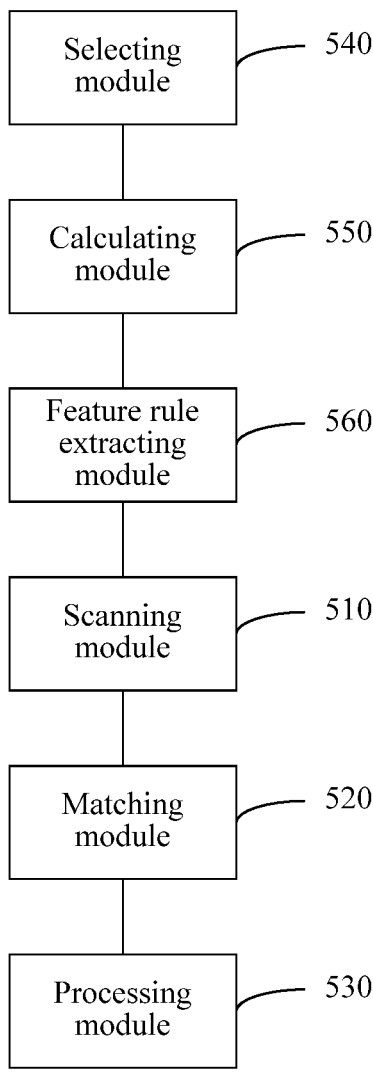
FIG. 6 is a block diagram of a device for identifying and processing a user identity according to another embodiment.

FIG. 6 is a structural block diagram of a device for processing a user identity according to another embodiment. As shown in FIG. 6, the device for processing a user identity includes a scanning module 510, a matching module 520, and a processing module 530, and further includes a selecting module 540, a calculating module 550, and a feature rule extracting module 560.

The selecting module 540 is configured to: before the scanning a source data table to obtain a feature of data corresponding to each field of the source data table, select data of a user identity field from test data as positive sample data, and select data of a non-user identity field as negative sample data.

Specifically, the test data may be taken from the massive network usage data. The user identity is an identity for uniquely representing a user. The user identity may be an instant messaging account, a mobile communication identity, an email address, an ID card number, or a payment account number.

For example, if the user identity is an instant messaging account, the test data may include data of the instant messaging account, advertisement exposure data, commodity order path data, web browsing data, user search data, and the like. Data corresponding to an instant messaging account field is extracted from the test data to serve as the positive sample data. Data corresponding to a non-instant messaging account field is randomly selected to serve as the negative sample data, and the negative sample data serves as a reference group.

The calculating module 550 is configured to perform feature calculations on the positive sample data and the negative sample data, separately.

Specifically, average values and standard deviations of the positive sample data sets and the negative sample data sets are respectively obtained. Maximal values and minimum values may also be obtained. Features of the calculated positive sample data and negative sample data may be collected in a table with, e.g., fields as rows and features as columns.

The feature rule extracting module 560 is configured to compare the feature of the positive sample data with the feature of the negative sample data, to obtain a feature rule of the positive sample data.

Specifically, the feature of the positive sample data and the feature of the negative sample data may be collected. By comparing via, e.g., a bar chart, it may be determined that the features of the positive sample data and the negative sample data are significantly different. Therefore, a reliable range of feature for the user identity is extracted, and then the feature rule of the user identity is established.

The fields containing user identity in the test data are selected as the positive sample data, and data fields that do not contain user identity are selected as the negative sample data. The feature of the positive sample data and the feature of the negative sample data are calculated, and a feature rule of the positive sample data is obtained through a comparison. As a result, a relatively accurate feature rule of the user identity may be obtained.

Figure 7:
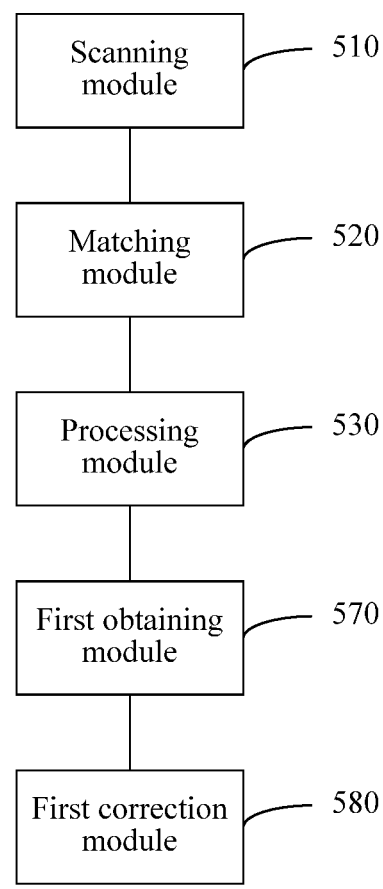
FIG. 7 is a block diagram of a device for identifying and processing a user identity according to another embodiment.

FIG. 7 is a structural block diagram of a device for processing a user identity according to another embodiment. As shown in FIG. 7, the device for processing a user identity includes a scanning module 510, a matching module 520, and a processing module 530, and further includes a first obtaining module 570, and a first correction module 580.

The first obtaining module 570 is configured to: after converting the data that corresponds to the field in the source data table identified as user identity into a third-party user account, and keeping the data that corresponds to the field in the source data table identified as not containing user identity unchanged, obtain data corresponding to the field that is in the source data table successfully matched and data corresponding to the field that is in the source data table but fails to be matched but contains user identity.

The first correction module 580 is configured to correct the feature rule of the user identity according to the data corresponding to the field that is successfully matched and the data corresponding to the field that fails to be matched but contains user identity.

Specifically, a naming rule and/or a type of the user identity may be obtained by analyzing the data corresponding to the field that fails to be matched but contains user identity. The naming rule and/or the type of the user identity is added into the feature rule of the user identity, and therefore, the field would not be misidentified as not containing user identity in a next matching.

Figure 8:
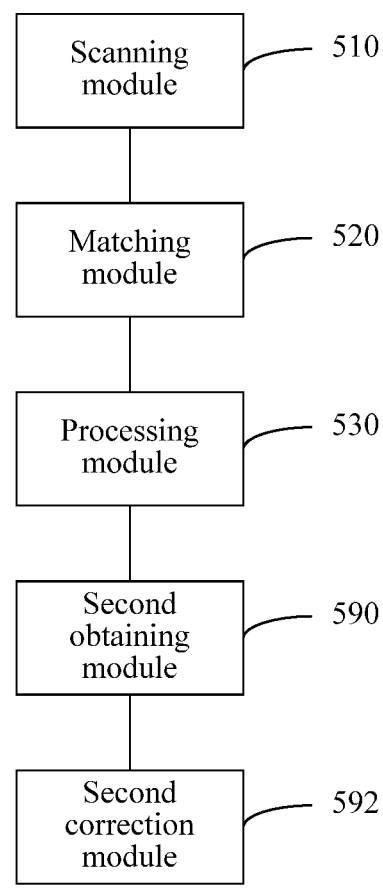
FIG. 8 is a block diagram of a device for identifying and processing a user identity according to yet another embodiment.

FIG. 8 is a structural block diagram of a device for processing a user identity according to another embodiment. As shown in FIG. 8, the device for processing a user identity includes a scanning module 510, a matching module 520, and a processing module 530, and further includes a second obtaining module 590, and a second correction module 592.

The second obtaining module 590 is configured to: after converting the data that corresponds to the field in the source data table and that is identified as containing user identity into a third-party user account, and keeping the data that corresponds to the field in the source data table and that is identified as not containing user identity unchanged, obtain data corresponding to the field that is in the source data table and that fails to be matched but contains user identity.

The second correction module 592 is configured to correct the feature rule of the user identity according to the data corresponding to the field that fails to be matched but contains user identity.

Specifically, a naming rule and/or a type of the user identity may be obtained by analyzing the data corresponding to the field that fails to be matched but contains the user identity. The naming rule and/or the type of the user identity is added into the feature rule of the user identity, and therefore, the field would not be misidentified as not containing user identity in a next matching.

To summarize, the implementations above discloses a method for automatically converting electronic data. The method includes scanning a source data table containing data fields; determining a feature for each of the data fields of the source data table; comparing the feature for each of the data fields with a feature rule for identifying user-identity-containing data fields in the source data table; identifying a first data field of the source data table as containing user identity when the feature of the first data field matches the feature rule; identifying a second data field of the source data table as containing no user identity when the feature of the second data field fails to match the feature rule; converting the source data table by replacing data items of the first data field in the source data table identified as containing user identity with corresponding third-party user accounts, and keeping the second data field in the source data table identified as not containing user identity unaltered; and storing the converted data table in a storage medium.

Before the step of the scanning the source data table and determining the feature for each of the data fields of the source data table above, the method may further include selecting a user-identity-containing data field from a set of test data as positive sample data, and selecting a non-user-identity-containing data field of the set of test data as negative sample data; performing feature calculation on the positive sample data and the negative sample data separately to obtain a feature for the positive sample data and a feature for the negative sample data; and comparing the feature of the positive sample data with the feature of the negative sample data, to obtain a feature rule of the positive sample data, wherein the feature rule of the positive sample data is used as the feature rule for identifying user-identity-containing data fields in the source data table.

After the step of converting the source data table, the methods above may further include determining that the first data field and second data field of the source data table before converting actually both contain user identity and that the second data field was misidentified as not containing user identity; and correcting the feature rule for identifying user-identity-containing data fields according to the first data field and the second data field of the source data table before converting. Alternatively, after the step of converting the source data table, the methods above may further include determining that the second data field of the data source table was misidentified as not containing user identity; and correcting the feature rule for identifying user-identity-containing data fields according to the second data field of the data table.

For the methods above, the feature for each of the data fields of the source data table may include one of an average value and a standard deviation, and the user identity comprises an instant messaging account, a mobile communication identity, an email address, an ID card number, or a payment account number.

The above methods may be implemented by a terminal device containing a memory and a processor, wherein the memory includes instructions and the processor, when executing the instructions, is configured to cause the terminal to perform the steps of the methods above. A non-volatile and non-transitory computer media is further disclosed for storing the instructions above.

A person of ordinary skill in the art may understand that all or some of the processes of the methods in the embodiments may be implemented by a computer program instructing relevant hardware. The program may be stored in a non-volatile computer readable storage medium. When the program runs, the processes of the methods in the embodiments are performed. The storage medium may be a magnetic disk, or an optical disc, a read-only memory (ROM), or the like.

The foregoing embodiments only describe several exemplary implementations of the present disclosure, and their description is specific and detailed, but cannot be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A method for automatically converting electronic data, comprising:
    scanning, by an electronic device having a processor and a memory, a source data table containing data fields wherein each data field comprises a plurality of data items, the memory having stored therein a computer readable instructions executed by the processor;
    determining, by the electronic device, a single statistical feature as a combinational property of the plurality of data items for each of the data fields of the source data table by performing statistical calculation of the data items contained in each of the data fields, wherein the single statistical feature comprises an average value and a standard deviation of the plurality of data items;
    comparing, by the electronic device, the single statistical feature for each of the data fields with a feature rule for identifying user-identity-containing data fields in the source data table to obtain a comparison result;

identifying, by the electronic device, a first data field of the source data table as containing user identity when the comparison result indicates the single statistical feature of the first data field matches the feature rule;

identifying, by the electronic device, a second data field of the source data table as containing no user identity when the comparison result indicates the single statistical feature of the second data field fails to match the feature rule;

converting, by the electronic device, the source data table by replacing each of the data items of the first data field in the source data table identified as containing user identity with a corresponding third-party user identity, and keeping the second data field in the source data table identified as not containing user identity unaltered, wherein the third-party user identity comprises an openID associated with the third-party user identity and is used to login to a third party platform; and storing the converted data table in a storage device, wherein before the step of the scanning the source data table and determining the single statistical feature for each of the data fields of the source data table, the method further comprises establishing the feature rule using a set of test data by:

selecting a known user-identity-containing data field from the set of test data as positive sample data, and selecting a known non-user-identity-containing data field of the set of test data as negative sample data;

performing feature calculation on the positive sample data and the negative sample data separately to obtain a feature for the positive sample data and a feature for the negative sample data; and comparing the feature of the positive sample data with the feature of the negative sample data, to obtain a feature rule of the positive sample data as the feature rule for identifying user-identity-containing data fields in the source data table.

2. The method according to claim 1, after the step of converting the source data table, the method further comprises:

determining that the first data field and second data field of the source data table before converting actually both contain user identity and that the second data field was misidentified as not containing user identity; and correcting the feature rule for identifying user-identity-containing data fields according to the first data field and the second data field of the source data table before converting.

3. The method according to claim 1, wherein after the step of converting the source data table, the method further comprises:

determining that the second data field of the data source table was misidentified as not containing user identity; and correcting the feature rule for identifying user-identity-containing data fields according to the second data field of the data table.

4. The method according to claim 1, wherein the user identity comprises an instant messaging account, a mobile communication identity, an email address, an ID card number, or a payment account number.

5. A system, comprising a memory, a storage device, and a processor, the memory storing a computer readable instruction, and the instruction, when executed by the processor, causing the system to:

scan a source data table containing data fields wherein each data field comprises a plurality of data items;

determine a single statistical feature as a combinational property of the plurality of data items for each of the data field of the source data table by performing statistical calculation of the data items contained in each of the data fields, wherein the single statistical feature comprises an average value and a standard deviation of the plurality of data items;

compare the single statistical feature for each of the data fields with a feature rule for identifying user-identity-containing data fields in the source data table to obtain a comparison result;

identify a first data field of the source data table as containing user identity when the comparison result indicates the single statistical feature of the first data field matches the feature rule;

identify a second data field of the source data table as containing no user identity when the comparison result indicates the single statistical feature of the second data field fails to match the feature rule;

convert the source data table by replacing each of the data items of the first data field in the source data table identified as containing user identity with a corresponding third-party user identity, and keeping the second data field in the source data table identified as not containing user identity unaltered, wherein the third-party user identity comprises an open ID associated with the third-party user identity and is used to login to a third party platform; and store the converted data table in the storage device, wherein before the step of the scanning the source data table and determining the single statistical feature for each of the data fields of the source data table, the processor is further configured to cause the system to establish the feature rule using a set of test data by:

selecting a known user-identity-containing data field from the set of test data as positive sample data, and selecting a known non-user-identity-containing data field of the set of test data as negative sample data;

performing feature calculation on the positive sample data and the negative sample data separately to obtain a feature for the positive sample data and a feature for the negative sample data; and the feature of the positive sample data with the feature of the negative sample data, to obtain a feature rule of the positive sample data as the feature rule for identifying user-identity-containing data fields in the source data table.

6. The system according to claim 5, wherein the processor, after executing the instructions to cause the system to convert the source data table, is further configured to execute the instruction to cause the system to:

determine that the first data field and second data field of the source data table before converting actually both contain user identity and that the second data field was misidentified as not containing user identity; and correct the feature rule for identifying user-identity-containing data fields according to the first data field and the second data field of the source data table before converting.

7. The system according to claim 5, wherein the processor, after executing the instructions to cause the system to convert the source data table, is further configured to execute the instruction to cause the system to:

determine that the second data field of the data source table was misidentified as not containing user identity; and correct the feature rule for identifying user-identity-containing data fields according to the second data field of the data table.

8. The system according to claim 5, wherein the user identity comprises an instant messaging account, a mobile communication identity, an email address, an ID card number, or a payment account number.

9. One or more non-volatile and non-transitory computer readable storage medium comprising computer executable instructions, the computer executable instructions, when executed by one or more processors, causing the processor to:

scan a source data table containing data fields wherein each data field comprises a plurality of data items;

determine a single statistical feature as a combinational property of the plurality of data items for each of the data field of the source data table by performing statistical calculation of the data items contained in each of the data fields, wherein the single statistical feature comprises an average value and a standard deviation of the plurality of data items;

compare the single statistical feature for each of the data fields with a feature rule for identifying user-identity-containing data fields in the source data table to obtain a comparison result;

identify a first data field of the source data table as containing user identity when the comparison result indicates the single statistical feature of the first data field matches the feature rule;

identify a second data field of the source data table as containing no user identity when the comparison result indicates the single statistical feature of the second data field fails to match the feature rule;

convert the source data table by replacing each of the data items of the first data field in the source data table identified as containing user identity with a corresponding third-party user identity, and keeping the second data field in the source data table identified as not containing user identity unaltered, wherein the third-party user identity comprises an open ID associated with the third-party user identity and is used to login to a third party platform; and store the converted data table in a storage device, wherein before the step of the scanning the source data table and determining the single statistical feature for each of the data fields of the source data table, the method further comprises establishing the feature rule using a set of test data by:

selecting a known user-identity-containing data field from the set of test data as positive sample data, and selecting a known non-user-identity-containing data field of the set of test data as negative sample data;

performing feature calculation on the positive sample data and the negative sample data separately to obtain a feature for the positive sample data and a feature for the negative sample data; and comparing the feature of the positive sample data with the feature of the negative sample data, to obtain a feature rule of the positive sample data as the feature rule for identifying user-identity-containing data fields in the source data table.

10. The non-volatile and non-transitory computer readable storage medium according to claim 9, wherein the computer executable instructions, after being executed by the one or more processors to convert the source data table, further causing the one or more processors to:

determine that the first data field and second data field of the source data table before converting actually both contain user identity and that the second data field was misidentified as not containing user identity; and correct the feature rule for identifying user-identity-containing data fields according to the first data field and the second data field of the source data table before converting.

11. The non-volatile and non-transitory computer readable storage medium according to claim 9, wherein the computer executable instructions, after being executed by the one or more processors to convert the source data table, further causing the one or more processors to:

determine that the second data field of the data source table was misidentified as not containing user identity; and correct the feature rule for identifying user-identity-containing data fields according to the second data field of the data table.

12. The non-volatile and non-transitory computer readable storage medium according to claim 9, wherein the user identity comprises an instant messaging account, a mobile communication identity, an email address, an ID card number, or a payment account number.

* * * * *

UNITED STATES PATENT AND TRADEMARK OFFICE
CERTIFICATE OF CORRECTION

PATENT NO. : 10,878,121 B2
APPLICATION NO. : 15/667023
DATED : December 29, 2020
INVENTOR(S) : Qianquian Yao et al.

Page 1 of 1

It is certified that error appears in the above-identified patent and that said Letters Patent is hereby corrected as shown below:

In the Claims

In Column 16, Claim 5, Line 28, delete "open ID" and insert -- openID --.

In Column 17, Claim 9, Line 43, delete "open ID" and insert -- openID --.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*